(No Model.)

A. W. CRAM.
DRAIN PIPE.

No. 492,191. Patented Feb. 21, 1893.

WITNESSES—
Geo. E. Fuch.
Rolf Fitzgerald.

INVENTOR—
A. W. Cram,
By Lehmann Pattison & Nesbit attys.

UNITED STATES PATENT OFFICE.

ALONZO W. CRAM, OF HAVERHILL, MASSACHUSETTS.

DRAIN-PIPE.

SPECIFICATION forming part of Letters Patent No. 492,191, dated February 21, 1893.

Application filed July 6, 1892. Serial No. 439,118. (No model.)

*To all whom it may concern:*

Be it known that I, ALONZO W. CRAM, of Haverhill, in the county of Essex and State of Massachusetts, have invented certain new and useful Improvements in Drain-Pipes; and I do hereby declare the following to be a full, clear, and exact description of the invention, such as will enable others skilled in the art to which it pertains to make and use it, reference being had to the accompanying drawings, which form part of this specification.

My invention relates to an improvement in drain pipes: and it consists in the novel features of construction hereinafter fully described and pointed out in the claims.

The object is to provide an improved gasket clamping yoke.

Figure 1:
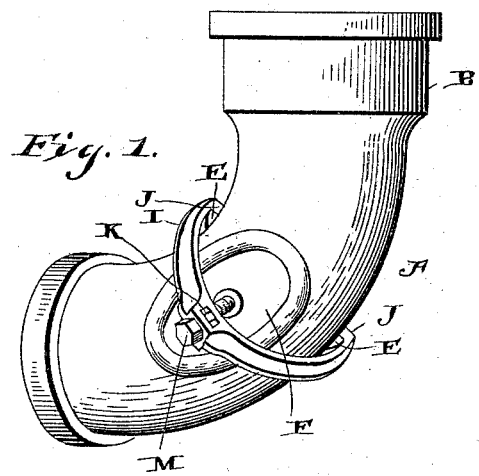
Figure 2:
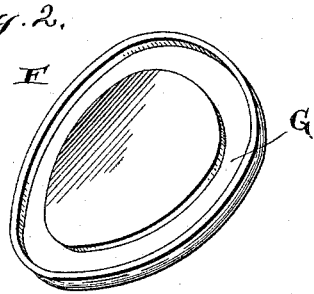
Figure 3:
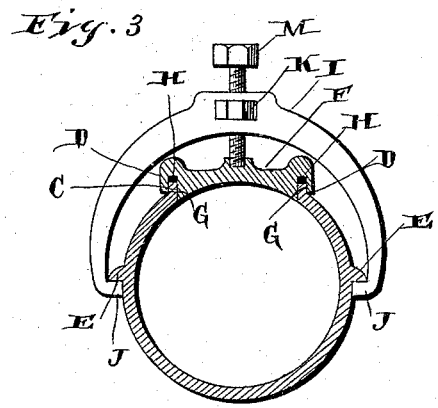

Referring to the accompanying drawings,—Figure 1, is a perspective view of my improved pipe bend. Fig. 2 is a detached view of the cover. Fig. 3 is a sectional view.

The bent pipe section or elbow A, may be constructed with a bell B, on one or both ends as may be desired. Formed at the bend of the pipe in the side thereof, mid-way between the concave and convex walls is the opening C, which may be of any preferred form but which is here shown as oval. Surrounding this opening is the projecting flange D.

E, represents lugs which project respectively from the concave and convex sides of the pipe section to which the ends of the clamping yoke are anchored. The cover, F, is made concave on its under side to conform to the curvature of the interior of the pipe. Encircling this cover is the upwardly recessed flange G, which when the same is in position fits over the flange D, surrounding the opening C, thus making a very tight fit.

For the purpose of sealing the opening and thus preventing the escape of matter a ring H, of rubber or other material is placed as shown between the flanges, on top of the flange D, and under the flange G.

The yoke I, has its opposite ends inturned as shown at J, where they engage the under sides of the projecting lugs E. The center of the yoke is slotted or recessed as shown at K, and inserted therein is the screw threaded nut L. The yoke is recessed vertically at the point where it is slotted and inserted in this recess is the set screw M, which is adjusted vertically through the nut L, and by means of the above described yoke and screw the gasket F, is kept in place, the lower end of the screw resting in a slight depression in the upper face of the cover. The upper end of the screw may be formed with a thumb hold or made square as here shown for the purpose of accommodating a wrench.

I do not claim to be the first to provide pipe sections with clean out openings, nor do I claim to be the first to secure the coverings to the same by yokes.

The novelty of my invention consists in forming the opening in the pipe adjacent its convex side rather than thereon. By thus forming the pipe bend all strain on the gasket by matter being dashed against it while passing the bend in the pipe is avoided. The strength of the pipe section when constructed as here shown is in no way diminished while the lugs E, help materially to strengthen the pipe walls at the points of their greatest curvature.

Having thus described my invention, I claim—

1. The combination of a pipe section having an opening, a cover therefor, a yoke secured over the cover which is formed with a cross slot or recess and an intersecting vertical recess, a screw threaded nut adapted to be inserted in the cross slot, and a screw adapted to be adjusted through the said nut and vertical recess in the yoke for the purpose of clamping the cover in position, substantially as shown and described.

2. The combination of a pipe section provided with an opening, a flange surrounding the opening, a cover having an upwardly recessed flange which fits over the first named flange, lugs projecting from the pipe section on opposite sides of the opening, a yoke having inturned ends which engage the said lugs, the yoke being formed with intersecting vertical and cross recesses, a screw threaded nut adapted to be inserted in the cross recess, and a set screw adapted to be adjusted therein through the said vertical recess, substantially as shown and described.

In testimony whereof I affix my signature in presence of two witnesses.

ALONZO W. CRAM.

Witnesses:
FRANK KEEZER,
HARRY J. COLE.